(12) United States Patent
Hatanaka et al.

(10) Patent No.: US 7,838,105 B2
(45) Date of Patent: Nov. 23, 2010

(54) MICROSTRUCTURE AND METHOD OF MANUFACTURING THE SAME

(75) Inventors: Yusuke Hatanaka, Haibara-gun (JP); Tadabumi Tomita, Haibara-gun (JP); Yoshinori Hotta, Aichi (JP); Akio Uesugi, Haibara-gun (JP)

(73) Assignee: FUJIFILM Corporation, Tokyo (JP)

( * ) Notice: Subject to any disclaimer, the term of this patent is extended or adjusted under 35 U.S.C. 154(b) by 123 days.

(21) Appl. No.: 11/856,154

(22) Filed: Sep. 17, 2007

(65) Prior Publication Data
US 2008/0070056 A1 Mar. 20, 2008

(30) Foreign Application Priority Data
Sep. 15, 2006 (JP) ............................. 2006-250773

(51) Int. Cl.
*C25D 11/06* (2006.01)
*B32B 3/26* (2006.01)

(52) U.S. Cl. .................... 428/304.4; 205/221; 205/172; 205/175; 205/324; 428/702; 428/312.8; 428/313.9; 428/469; 428/689; 428/312.6

(58) Field of Classification Search ........................ None
See application file for complete search history.

(56) References Cited

U.S. PATENT DOCUMENTS

2005/0136609 A1* 6/2005 Mosley et al. ............... 438/381
2005/0196644 A1* 9/2005 Itoh et al. .................... 428/835

OTHER PUBLICATIONS

Masuda et al. ("Fabrication of Gold Nanodot Array Using Anodic Porous Alumina as an Evaporation Mask" Japanese Journal of Applied Physics, Japan Society of Applied Physics, Tokyo, Jp, vol. 35, No. Ib, Part 2, Jan. 15, 1996, pp. 126-129, Xp009038116 Issn: 0021-4922).*
Brock, Membrane Filtration: A User's Guide and Reference Manual, 1993, pp. 26-45 and 338-349, Science Tech, Inc. Madison, WI.
"New Technique for Preparation of Porous Membrane Based on Anodizing Process," ALUTOPIA, vol. 25, No. 7, Jul. 1995, pp. 41-45 (3 page English Translation).

* cited by examiner

*Primary Examiner*—Ling Xu
(74) *Attorney, Agent, or Firm*—Sughrue Mion, PLLC (57) ABSTRACT

Disclosed is a microstructure comprising an aluminum anodized film bearing through micropores, wherein a surface of the microstructure is covered with a protective film for preventing hydration of the aluminum anodized film. The microstructure may be used as a porous alumina membrane filter excellent in filtration rate and its stability with time.

4 Claims, 3 Drawing Sheets

MICROSTRUCTURE AND METHOD OF MANUFACTURING THE SAME

The entire contents of all documents cited in this specification are incorporated herein by reference.

BACKGROUND OF THE INVENTION

The present invention relates to a microstructure and its manufacturing method.

Filter membranes including organic membranes and inorganic membranes are commercialized in the field of microfiltration, and such organic membranes are actually widely used. In most of the organic membranes, pores are not separated from each other and the pore size distribution is relatively broad. Therefore, researches for further improving the accuracy in the separation of a target substance which is the most important filter function have been made in various fields.

In order to solve such problems, a so-called track etching technique is known in which an organic film made of a polymer is irradiated with high energy particles generated in a nuclear reactor, and tracks of the particles through the organic film are etched to form micropores (see T. D. Brock, Membrane Filtration, Sci. Tech, Inc., Madison (1983)). According to the track etching technique, discrete micropores with a narrow pore size distribution are formed orthogonally to the organic film, but this technique suffered from the problem that the pore density, that is, pore opening area ratio could not be increased to prevent overlapping pores from being generated due to incidence of particles on the film in an overlapping manner when forming tracks.

On the other hand, a porous alumina membrane filter making use of an anodized film of aluminum, such as the one described in Hideki Masuda, "New Technology of Porous Membranes Using Anodization" (ALTOPIA, July 1995) is known for the inorganic membrane. Aluminum is anodized in an acidic electrolytic solution to dispose discrete micropores having a narrow pore size distribution to achieve a high pore opening area ratio, so a membrane filter with a high filtration rate per unit time can be produced at low cost.

Specific examples of the application of such organic and inorganic membranes include a protein adsorbent, water purification, air washing, a structure for deodorization/denitration/exhaust gas equipment, ozone removal, removal of various viruses, a clean room material, gas separation, a red cell deformation test, a radioactive assay of chemotaxis using a culture chamber and a scanning electron microscope, various treatments in tests using, for example, exfoliative cytology, fluorescent X-rays and et al., alkaline elution, monitoring of asbestos, detection of a parasite, IR analysis of particles in the air, and analysis of algae in a river or sea. Such membranes may also be used in fractionating slurry particles, pigments, dyes, and magnetic substances used in chemical mechanical polishing (CMP).

However, improvements to the porous alumina membrane filter have been desired because of the fact that the structure of the porous alumina membrane filter includes an anodized film of aluminum, and when an aqueous solution is separated over a long time, hydration of the anodized film occurs, which may result in a reduced pore diameter and insufficient stability with time of the filtration rate.

SUMMARY OF THE INVENTION

It is therefore an object of the present invention to provide a microstructure that may be used as a porous alumina membrane filter excellent in filtration rate and its stability with time.

Another object of the present invention is to provide a process for producing such microstructure.

The inventors of the present invention have made intensive studies to achieve the above objects and completed the present invention by forming on a surface of an aluminum anodized film constituting a microstructure, a protective film for preventing hydration of the aluminum anodized film.

Accordingly, the invention provides the following (i) to (iv).

(i) A microstructure including an aluminum anodized film bearing through micropores, wherein a surface of the microstructure is covered with a protective film for preventing hydration of the aluminum anodized film.

(ii) The microstructure according to (i) above, wherein the protective film is an inorganic protective film containing at least one element selected from the group consisting of zirconium and silicon or an organic protective film containing a water-insoluble polymer.

(iii) The microstructure according to (i) or (ii) above, wherein a degree of ordering of micropores as defined by formula (1):

$$\text{Degree of Ordering (\%)} = B/A \times 100 \qquad (1)$$

(wherein A represents a total number of micropores in a measurement region; and B represents a number of specific micropores in the measurement region for which, when a circle is drawn so as to be centered on a center of gravity of a specific micropore and so as to be of a smallest radius that is internally tangent to an edge of another micropore, the circle includes centers of gravity of six micropores other than the specific micropore) is at least 20%, and a pore opening area ratio as defined by formula (2):

$$\text{Pore opening area ratio (\%)} = C/D \times 100 \qquad (2)$$

(wherein C represents a sum of opening areas of the micropores in the measurement region; and D is an area of the measurement region) is at least 40%.

(iv) A microstructure formed by subjecting an aluminum substrate at least to, in order, (A) an anodizing treatment to form an anodized film bearing micropores;

(B) an aluminum removal treatment to remove aluminum from the aluminum substrate on which the anodized film obtained by the anodizing treatment (A) is formed;

(C) a through micropore-forming treatment to make the micropores extend through the anodized film obtained by the anodizing treatment (A); and (D) a protective film-forming treatment to form a protective film for preventing hydration of the anodized film on a surface of the anodized film.

According to the present invention, a microstructure that may be used as a porous alumina membrane filter excellent in filtration rate and its stability with time can be obtained.

DETAILED DESCRIPTION OF THE PREFERRED EMBODIMENTS

The invention is described more fully below.

The present invention provides a microstructure including an aluminum anodized film bearing through micropores, wherein a surface of the microstructure is covered with a protective film for preventing hydration of the aluminum anodized film.

The microstructure of the present invention is preferably formed by subjecting an aluminum substrate at least to, in order, (A) an anodizing treatment to form an anodized film bearing micropores;

(B) an aluminum removal treatment to remove aluminum from the aluminum substrate on which the anodized film obtained by the anodizing treatment (A) is formed;

(C) a through micropore-forming treatment to make the micropores extend through the anodized film obtained by the anodizing treatment (A); and (D) a protective film-forming treatment to form a protective film for preventing hydration of the anodized film on a surface of the anodized film.

<Aluminum Substrate>

The aluminum substrate is not subject to any particular limitation. Illustrative examples include pure aluminum plate; alloy plates composed primarily of aluminum and containing trace amounts of other elements; substrates made of low-purity aluminum (e.g., recycled material) on which high-purity aluminum has been vapor-deposited; substrates such as silicon wafers, quartz or glass whose surface has been covered with high-purity aluminum by a process such as vapor deposition or sputtering; and resin substrates on which aluminum has been laminated.

Of the aluminum substrate, the surface on which an anodized film is to be provided by anodizing treatment has an aluminum purity of preferably at least 99.5 wt %, more preferably at least 99.9 wt % and even more preferably at least 99.99 wt %. At an aluminum purity within the above range, the micropore arrangement will be sufficiently well-ordered.

The surface of the aluminum substrate is preferably subjected to degreasing and mirror-like finishing in advance.

The aluminum substrate is preferably subjected to heat treatment in advance. Heat treatment enables the orderliness of the array of micropores to be enhanced.

<Heat Treatment>

Heat treatment is preferably carried out at a temperature of from 200 to 350° C. for a period of about 30 seconds to about 2 minutes. The orderliness of the array of micropores formed in the subsequently described anodizing treatment is enhanced in this way.

Following heat treatment, it is preferable to rapidly cool the aluminum substrate. The method of cooling is exemplified by a method involving direct immersion of the aluminum substrate in water or the like.

<Degreasing>

Degreasing is carried out with a suitable substance such as an acid, alkali or organic solvent so as to dissolve and remove organic substances, including dust, grease and resins, adhering to the aluminum surface, and thereby prevent defects due to organic substances from arising in each of the subsequent treatments.

Known degreasers may be used in degreasing treatment. For example, degreasing may be carried out using any of various commercially available degreasers by the prescribed method.

Preferred methods include the following: a method in which an organic solvent such as an alcohol (e.g., methanol), a ketone, benzine or a volatile oil is brought into contact with the aluminum surface at ambient temperature (organic solvent method); a method in which a liquid containing a surfactant such as soap or a neutral detergent is brought into contact with the aluminum surface at a temperature of from ambient temperature to 80° C., after which the surface is rinsed with water (surfactant method); a method in which an aqueous sulfuric acid solution having a concentration of 10 to 200 g/L is brought into contact with the aluminum surface at a temperature of from ambient temperature to 70° C. for a period of 30 to 80 seconds, following which the surface is rinsed with water; a method in which an aqueous solution of sodium hydroxide having a concentration of 5 to 20 g/L is brought into contact with the aluminum surface at ambient temperature for about 30 seconds while electrolysis is carried out by passing a direct current through the aluminum surface as the cathode at a current density of 1 to 10 A/dm$^2$, following which the surface is brought into contact with an aqueous solution of nitric acid having a concentration of 100 to 500 g/L and thereby neutralized; a method in which any of various known anodizing electrolytic solutions is brought into contact with the aluminum surface at ambient temperature while electrolysis is carried out by passing a direct current at a current density of 1 to 10 A/dm$^2$ or an alternating current through the aluminum surface as the cathode; a method in which an aqueous alkali solution having a concentration of 10 to 200 g/L is brought into contact with the aluminum surface at 40 to 50° C. for 15 to 60 seconds, following which the surface is brought into contact with an aqueous nitric acid solution having a concentration of 100 to 500 g/L and thereby neutralized; a method in which an emulsion prepared by mixing a surfactant, water or the like into an oil such as gas oil or kerosene is brought into contact with the aluminum surface at a temperature of from ambient temperature to 50° C., following which the surface is rinsed with water (emulsion degreasing method); and a method in which a mixed solution of, for example, sodium carbonate, a phosphate and a surfactant is brought into contact with the aluminum surface at a temperature of from ambient temperature to 50° C. for 30 to 180 seconds, following which the surface is rinsed with water (phosphate method).

The method used for degreasing is preferably one which can remove grease from the aluminum surface but causes substantially no aluminum dissolution. Hence, an organic solvent method, surfactant method, emulsion degreasing method or phosphate method is preferred.

<Mirror-Like Finishing Treatment>

Mirror-like finishing treatment is carried out to eliminate surface asperities on the aluminum substrate and improve the uniformity and reproducibility of grain-forming treatment by a process such as electrodeposition. Examples of surface asperities on the aluminum substrate include rolling streaks formed during rolling when the aluminum substrate has been produced by a process including rolling.

In the practice of the invention, mirror-like finishing treatment is not subject to any particular limitation, and may be carried out using any suitable method known in the art. Examples of suitable methods include mechanical polishing, chemical polishing, and electrolytic polishing.

Illustrative examples of suitable mechanical polishing methods include polishing with various commercial abrasive cloths, and methods that combine the use of various commercial abrasives (e.g., diamond, alumina) with buffing. More specifically, a method which is carried out with an abrasive while changing over time the abrasive used from one having coarser particles to one having finer particles is appropriately illustrated. In such a case, the final abrasive used is preferably one having a grit size of 1500. In this way, a glossiness of at least 50% (in the case of rolled aluminum, at least 50% in both the rolling direction and the transverse direction) can be achieved.

Examples of chemical polishing methods include various methods mentioned in the $6^{th}$ edition of Aluminum Handbook (Japan Aluminum Association, 2001), pp. 164-165.

Preferred examples include phosphoric acid/nitric acid method, Alupol I method, Alupol V method, Alcoa R5 method, $H_3PO_4$—$CH_3COOH$—$Cu$ method and $H_3PO_4$—$HNO_3$—$CH_3COOH$ method. Of these, the phosphoric acid/nitric acid method, the $H_3PO_4$—$CH_3COOH$—$Cu$ method and the $H_3PO_4$—$HNO_3$—$CH_3COOH$ method are especially preferred.

With chemical polishing, a glossiness of at least 70% (in the case of rolled aluminum, at least 70% in both the rolling direction and the transverse direction) can be achieved.

Examples of electrolytic polishing methods include various methods mentioned in the $6^{th}$ edition of Aluminum Handbook (Japan Aluminum Association, 2001), pp. 164-165.

A preferred example is the method described in U.S. Pat. No. 2,708,655.

The method described in Jitsumu Hyomen Gijutsu (Practice of Surface Technology), Vol. 33, No. 3, pp. 32-38 (1986) is also preferred.

With electrolytic polishing, a glossiness of at least 70% (in the case of rolled aluminum, at least 70% in both the rolling direction and the transverse direction) can be achieved.

These methods may be suitably combined and used. In a preferred example, a method that uses an abrasive is carried out by changing over time the abrasive used from one having coarser particles to one having finer particles, following which electrolytic polishing is carried out.

Mirror-like finishing treatment enables a surface having, for example, a mean surface roughness $R_a$ of 0.1 μm or less and a glossiness of at least 50% to be obtained. The mean surface roughness $R_a$ is preferably 0.03 μm or less, and more preferably 0.02 μm or less. The glossiness is preferably at least 70%, and more preferably at least 80%.

The glossiness is the specular reflectance which can be determined in accordance with JIS Z8741-1997 (Method 3: 60° Specular Gloss) in a direction perpendicular to the rolling direction. Specifically, measurement is carried out using a variable-angle glossmeter (e.g., VG-1D, manufactured by Nippon Denshoku Industries Co., Ltd.) at an angle of incidence/reflection of 60° when the specular reflectance is 70% or less, and at an angle of incidence/reflection of 20° when the specular reflectance is more than 70%.

<Micropore Formation through Anodization>

In treatment (A), the aluminum substrate is anodized to form an anodized film having micropores on the aluminum substrate surface.

Any conventionally known method can be used for anodizing treatment. More specifically, a self-ordering method to be described below is preferably used.

The self-ordering method is a method which enhances the orderliness by using the regularly arranging nature of micropores in the anodized film and eliminating factors that may disturb an orderly arrangement. Specifically, an anodized film is formed on high-purity aluminum at a voltage appropriate for the type of electrolytic solution and at a low speed over an extended period of time (e.g., from several hours to well over ten hours).

In this method, because the pore diameter is dependent on the voltage, the desired pore diameter can be obtained to a certain degree by controlling the voltage.

Anodizing treatment to be described later may be performed to form micropores by the self-ordering method, but it is preferable to perform anodizing treatment, film removal treatment and re-anodizing treatment to be described later in this order.

<Anodizing Treatment>

The average flow rate in anodizing treatment is preferably 0.5 to 20.0 m/min, more preferably 1.0 to 15.0 m/min and even more preferably 2.0 to 10.0 m/min. Uniformity and high orderliness can be achieved by performing anodizing treatment at a flow rate within the above range.

The method of flowing the electrolytic solution under the condition described above is not subject to any particular limitation, and a method which uses a general stirring device such as a stirrer may be employed. Use of a stirrer capable of controlling the stirring speed in the digital display mode is preferable because the average flow rate can be controlled. An example of such stirring device includes a magnetic stirrer HS-50D (produced by As One Corporation).

Anodizing treatment may be carried out by, for example, a method that involves passing an electrical current through the aluminum substrate as the anode in a solution having an acid concentration of 1 to 10 wt %. Solutions that may be used in anodizing treatment are preferably acid solutions. It is preferable to use sulfuric acid, phosphoric acid, chromic acid, oxalic acid, sulfamic acid, benzenesulfonic acid and amidosulfonic acid, and more preferably sulfuric acid, phosphoric acid and oxalic acid. These acids may be used singly or in combination of two or more.

The conditions for anodizing treatment vary depending on the electrolytic solution used, and thus cannot be strictly specified. However, it is generally, preferable for the electrolyte concentration to be 0.1 to 20 wt %, the temperature of the solution to be −10 to 30° C., the current density to be 0.01 to 20 A/dm², the voltage to be 3 to 300 V, and the period of electrolysis to be 0.5 to 30 hours. It is more preferable for the electrolyte concentration to be 0.5 to 15 wt %, the temperature of the solution to be −5 to 25° C., the current density to be 0.05 to 15 A/dm², the voltage to be 5 to 250 V, and the period of electrolysis to be 1 to 25 hours. It is particularly preferable for the electrolyte concentration to be 1 to 10 wt %, the temperature of the solution to be 0 to 20° C., the current density to be 0.1 to 10 A/dm², the voltage to be 10 to 200 V, and the period of electrolysis to be 2 to 20 hours.

Anodizing treatment is carried out for a period of preferably 0.5 minute to 16 hours, more preferably 1 minute to 12 hours, and even more preferably 2 minutes to 8 hours.

In addition to a method in which anodizing treatment is performed at a constant voltage, another method which involves changing the voltage continuously or intermittently may be used in anodizing treatment. In the latter case, it is preferable to gradually reduce the voltage. This method enables reduction of the resistance in the anodized film to make the formed micropores finer, and is therefore preferable in terms of improving uniformity particularly when sealing is carried out by electrodeposition.

The anodized film formed has a thickness of preferably 1 to 300 µm, more preferably 5 to 150 µm and even more preferably 10 to 100 µm.

The average pore density is preferably from 50 to 1,500 pores/µm$^2$.

The area ratio occupied by the micropores is preferably from 20 to 50%. The area ratio occupied by the micropores is defined as the proportion of the sum of the areas of the individual micropore openings to the area of the aluminum surface.

<Film Removal Treatment>

Aluminum removal treatment to be described below may be carried out immediately after the anodized film have been formed on the aluminum substrate surface by anodizing treatment, but after anodizing treatment, film removal treatment and re-anodizing treatment may be performed in this order before starting aluminum removal treatment.

Film removal treatment dissolves and removes at least part of the anodized film formed on the aluminum substrate surface by anodizing treatment.

The pore orderliness in the anodized film is increased toward the aluminum substrate, so ordered pits can be obtained by removing part of the anodized film through film removal treatment to bare its bottom portion remaining on the surface of the aluminum substrate. Therefore, film removal treatment does not dissolve aluminum but only the anodized film of alumina (aluminum oxide).

The solution for dissolving alumina is preferably an aqueous solution containing at least one selected from the group consisting of chromium compound, nitric acid, phosphoric acid, zirconium compound, titanium compound, lithium salt, cerium salt, magnesium salt, sodium silicofluoride, zinc fluoride, manganese compound, molybdenum compound, magnesium compound, barium compound and elemental halogen.

Examples of the chromium compound include chromium (III) oxide and chromium (VI) oxide.

Examples of the zirconium compound include ammonium fluorozirconate, zirconium fluoride and zirconium chloride.

Examples of the titanium compound include titanium oxide and titanium sulfide.

Examples of the lithium salt include lithium fluoride and lithium chloride.

Examples of the cerium salt include cerium fluoride and cerium chloride.

An example of the magnesium salt includes magnesium sulfide.

Examples of the manganese compound include sodium permanganate and calcium permanganate.

An example of the molybdenum compound includes sodium molybdate.

An example of the magnesium compound includes magnesium fluoride pentahydrate.

Examples of the barium compound include barium oxide, barium acetate, barium carbonate, barium chlorate, barium chloride, barium fluoride, barium iodide, barium lactate, barium oxalate, barium perchlorate, barium selenate, barium selenite, barium stearate, barium sulfite, barium titanate, barium hydroxide, barium nitrate and hydrates thereof. Of those barium compounds, barium oxide, barium acetate and barium carbonate are preferred and barium oxide is particularly preferred.

Examples of the elemental halogen include chlorine, fluorine and bromine.

The solution for dissolving aluminum is more preferably an acid-containing aqueous solution. Exemplary acids include sulfuric acid, phosphoric acid, nitric acid and hydrochloric acid, and a mixture of two or more acids may also be used.

The acid concentration is preferably at least 0.01 mol/L, more preferably at least 0.05 mol/L and even more preferably at least 0.1 mol/L. Although the upper limit is not particularly defined, in general, the acid concentration is preferably up to 10 mol/L and more preferably up to 5 mol/L. An unnecessarily high concentration is not economical and a higher acid concentration may dissolve the aluminum substrate.

The solution for dissolving alumina preferably has a temperature of −10° C. or higher and more preferably −5° C. or higher and even more preferably 0° C. or higher. Carrying out the treatment using a boiling aqueous solution destroys or disrupts the starting points for ordering. Hence, the aqueous solution is preferably used without being boiled.

The solution for dissolving alumina dissolves alumina, not aluminum. However, this solution may dissolve a small amount of aluminum as long as aluminum is not substantially dissolved.

Film removal treatment is carried out by bringing the aluminum substrate having the anodized film formed thereon into contact with the solution for dissolving alumina. The contacting method is not particularly limited and is exemplified by immersion and spraying. Of these, immersion is preferable.

Immersion is a treatment in which the aluminum substrate having the anodized film formed thereon is immersed in the solution for dissolving alumina. Immersion with stirring is preferable, because the treatment is uniformly carried out.

The aluminum substrate having the anodized film formed thereon is immersed in the solution for dissolving alumina for a period of preferably at least 10 minutes, more preferably at least 1 hour, even more preferably at least 3 hours, and most preferably at least 5 hours.

<Re-Anodizing Treatment>

Film removal treatment removes at least part of the anodized film to form ordered pits at the surface of the aluminum substrate, and the ordered pit-bearing aluminum substrate surface is subjected again to anodizing treatment to enable the anodized film with a higher degree of ordering of micropores to be formed.

Any known method may be used for anodizing treatment, but anodizing treatment is preferably carried out under the same conditions as those defined in <Anodizing Treatment>.

Suitable use can also be made of a method in which the current is repeatedly turned on and off in an intermittent manner while keeping the dc voltage constant, and a method in which the current is repeatedly turned on and off while intermittently changing the dc voltage. Because these methods enables make the formed micropores finer, they are preferable for improving uniformity, particularly when sealing is carried out by electrodeposition.

Anodizing treatment at a low temperature achieves an ordered array of micropores and a uniform pore diameter.

On the other hand, anodizing treatment at a relatively high temperature may disturb the ordered array of micropores so that the pore diameter may vary within a specified range. The variations in the pore diameter may also be controlled based on the treatment time.

The anodized film preferably has a thickness of 0.1 to 1,000 μm, more preferably 1 to 1,000 μm, even more preferably 1 to 500 μm, and most preferably 10 to 500 μm.

The micropore diameter is preferably from 0.01 to 0.5 μm.

The average pore density is preferably from 50 to 1,500 pores/μm$^2$.

Figure 1:
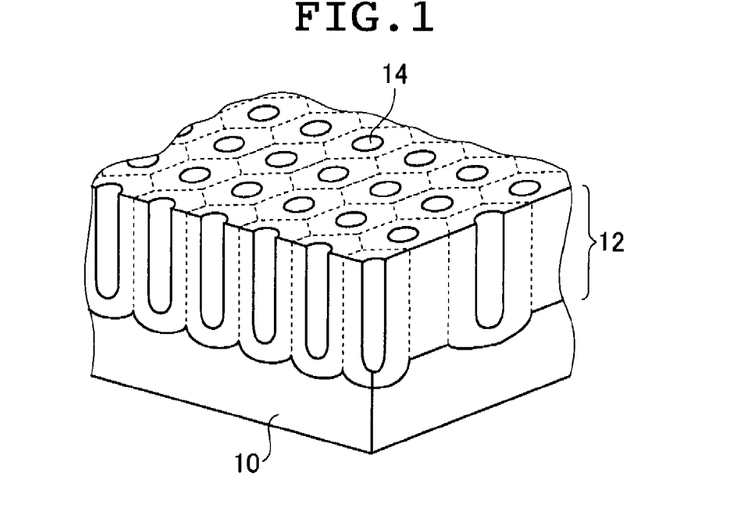
FIG. 1 is a partial sectional view showing the state after treatment (A)

FIG. 1 is a partial sectional view showing the state after treatment (A). As shown in FIG. 1, an anodized film 12 bearing micropores 14 is formed on a surface of an aluminum substrate 10.

<(B) Aluminum Removal Treatment>

Figure 2:
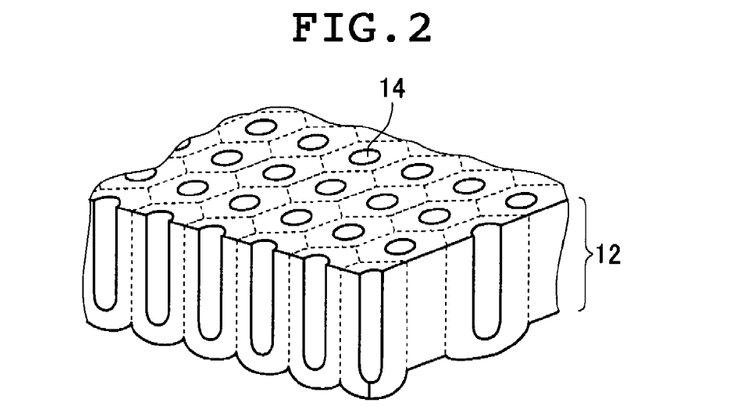
FIG. 2 is a partial sectional view showing the state after treatment (B)

Aluminum removal treatment dissolves and removes the aluminum substrate 10 from the state shown in FIG. 1. FIG. 2 is a partial sectional view showing the state after this treatment, and illustrates a microstructure including the anodized film 12 bearing the micropores 14.

Therefore, a treatment solution that dissolves not alumina but aluminum is used for aluminum removal treatment.

The treatment solution is not particularly limited as long as the solution used dissolves not alumina but aluminum. Examples of the treatment solution that may be used include aqueous solutions of mercury chloride, a bromine/methanol mixture, a bromine/ethanol mixture, aqua regia and a hydrochloric acid/copper chloride mixture.

The concentration is preferably from 0.01 to 10 mol/L and more preferably from 0.05 to 5 mol/L.

The treatment temperature is preferably from −10° C. to 80° C. and more preferably 0° C. to 60° C.

Aluminum removal treatment is carried out by bringing the aluminum substrate having the anodized film formed thereon into contact with the treatment solution described above. The contacting method is not particularly limited and is exemplified by immersion and spraying. Of these, immersion is preferable. The contacting time is preferably from 10 seconds to 5 hours and more preferably from 1 minute to 3 hours.

After aluminum removal treatment, the anodized film preferably has a thickness of 1 to 1,000 μm and more preferably 10 to 500 μm.

After aluminum removal treatment, the anodized film 12 is rinsed with water prior to treatment (C) to be described later. Rinsing is preferably carried out at 30° C. or lower in order to suppress the changes in the pore diameter of the micropores 14 due to hydration.

<(C) Through Micropore-Forming Treatment>

Figure 3:
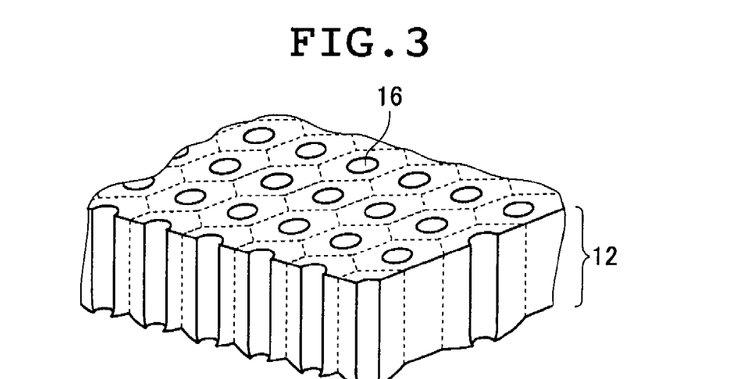
FIG. 3 is a partial sectional view showing the state after treatment (C)

In through micropore-forming treatment, the anodized film 12 bearing the micropores 14 shown in FIG. 2 is partially dissolved by immersion in an aqueous acid solution or aqueous alkali solution. The anodized film 12 at the bottoms of the micropores 14 is thus removed to make the micropores 14 extend through the anodized film 12 (to form through micropores 16). FIG. 3 is a partial sectional view showing the state after through micropore-forming treatment and illustrates a microstructure including the anodized film 12 bearing the through micropores 16.

In FIG. 3, all the micropores in the anodized film 12 are the through micropores 16. All the micropores in the anodized film 12 need not extend therethrough after treatment (C), but in the case where the microstructure of the present invention is used as a porous alumina membrane filter, it is preferable for 70% of the micropores in the anodized film to extend therethrough after treatment (C).

When through micropore-forming treatment is to be carried out with an aqueous acid solution, it is preferable to use an aqueous solution of an inorganic acid such as sulfuric acid, phosphoric acid, nitric acid or hydrochloric acid, or a mixture thereof. It is preferable for the aqueous acid solution to have a concentration of 1 to 10 wt % and a temperature of 25 to 40° C.

When through micropore-forming treatment is to be carried out with an aqueous alkali solution, it is preferable to use an aqueous solution of at least one alkali selected from the group consisting of sodium hydroxide, potassium hydroxide and lithium hydroxide. It is preferable for the aqueous alkali solution to have a concentration of 0.1 to 5 wt % and a temperature of 20 to 35° C.

Specific examples of preferred solutions include a 40° C. aqueous solution containing 50 g/L of phosphoric acid, a 30° C. aqueous solution containing 0.5 g/L of sodium hydroxide, and a 30° C. aqueous solution containing 0.5 g/L of potassium hydroxide.

The anodized film is immersed in the aqueous acid solution or aqueous alkali solution for a period of preferably 8 to 120 minutes, more preferably 10 to 90 minutes, and even more preferably 15 to 60 minutes.

After through micropore-forming treatment, the anodized film preferably has a thickness of 1 to 1,000 μm and more preferably 10 to 500 μm.

After through micropore-forming treatment, the anodized film 12 is rinsed with water prior to treatment (D) to be described later. Rinsing is preferably carried out at 30° C. or lower in order to suppress the changes in the pore diameter of the through micropores 16 due to hydration.

<(D) Protective Film-Forming Treatment>

The microstructure shown in FIG. 3 which includes the anodized film 12 bearing the through micropores 16 is subjected to protective film-forming treatment to form a protective film for preventing hydration of the anodized film over the whole surface of the anodized film 12 including the insides of the through micropores 16.

An inorganic protective film containing at least one element selected from the group consisting of zirconium and silicon or an organic protective film containing a water-insoluble polymer is used for the protective film.

<Inorganic Protective Film>

The protective film containing zirconium element is formed without any particular limitation. For example, a treatment method which includes directly immersing the microstructure in an aqueous solution of a zirconium compound is generally used, and an aqueous solution containing a zirconium compound and a phosphorus compound is preferably used in terms of the strength and stability of the protective film.

Examples of the zirconium compound that may be used include zirconium, zirconium fluoride, sodium fluorozirconate, calcium fluorozirconate, zirconium chloride, zirconium oxychloride, zirconium oxynitrate, zirconium sulfate, zirconium ethoxide, zirconium propoxide, zirconium butoxide, zirconium acetylacetonate, tetrachlorobis(tetrahydrofuran) zirconium, bis(methylcyclopentadienyl)zirconium dichloride, dicyclopentadienylzirconium dichloride, and ethylenebis(indenyl)zirconium(IV) dichloride. Sodium fluorozirconate is particularly preferable. The concentration is preferably from 0.01 to 10 wt % and more preferably from 0.05 to 5 wt % in terms of the thickness uniformity of the protective film.

Examples of the phosphorus compound that may be used include phosphoric acid, sodium phosphate, calcium phosphate, sodium hydrogenphosphate, and calcium hydrogenphosphate, and sodium hydrogenphosphate is particularly preferable. The concentration is preferably from 0.1 to 20 wt % and more preferably from 0.5 to 10 wt % in terms of the thickness uniformity of the protective film.

In order that the protective film formed may have an improved function of preventing hydration of the anodized film, the zirconium compound-containing aqueous solution preferably contains tannic acid when immersion is carried out. In this case, the concentration of the tannic acid in the aqueous solution is preferably from 0.05 to 10 wt % and more preferably from 0.1 to 5 wt %.

The treatment temperature is preferably from 0° C. to 120° C. and more preferably from 20° C. to 100° C.

The protective film containing silicon element is formed without any particular limitation. For example, a treatment method that includes directly immersing the microstructure in an aqueous solution of an alkali metal silicate or an alkaline earth metal silicate is generally used.

The thickness of the protective film may be adjusted by the ratio between the silicate components, that is, silicon dioxide ($SiO_2$) and an alkali metal oxide ($M_2O$) (as generally represented by the molar ratio of $[SiO_2]/[M_2O]$) and the concentration of the alkali metal silicate in the aqueous solution. Sodium and potassium are advantageously used for M.

The molar ratio of $[SiO_2]/[M_2O]$ is preferably from 0.1 to 5.0 and more preferably from 0.5 to 3.0. The $SiO_2$ content is preferably from 0.1 to 20 wt % and more preferably from 0.5 to 10 wt %.

The thickness of the protective film may also be adjusted by the ratio between the silicate components, that is, silicon dioxide ($SiO_2$) and an alkaline earth metal oxide (M'O) (as generally represented by the molar ratio of $[SiO_2]/[M'O]$) and the concentration of the alkaline earth metal silicate in the aqueous solution. Calcium, magnesium and barium are advantageously used for M'.

The molar ratio of $[SiO_2]/[M'O]$ is preferably from 0.1 to 10.0 and more preferably from 0.5 to 5.0. The $SiO_2$ content is preferably from 0.1 to 40 wt % and more preferably from 0.5 to 20 wt %.

<Organic Protective Film>

A method which includes directly immersing the microstructure in a solution of a water-insoluble polymer in an organic solvent, then volatilizing only the solvent through heat treatment is preferably used for the organic protective film.

Examples of the water-insoluble polymer include poly(vinylidene chloride), poly(meth)acrylonitrile, polysulphone, polyvinyl chloride, polyethylene, polycarbonate, polystylene, polyamide, and cellophane.

Examples of the organic solvent include ethylene dichloride, cyclohexanone, methyl ethyl ketone, methanol, ethanol, propanol, ethylene glycol monomethyl ether, 1-methoxy-2-propanol, 2-methoxyethyl acetate, 1-methoxy-2-propyl acetate, dimethoxyethane, methyl lactate, ethyl lactate, N,N-dimethylacetamide, N,N-dimethylformamide, tetramethylurea, N-methylpyrrolidone, dimethyl sulfoxide, sulfolane, γ-butyrolactone, and toluene. The concentration is preferably from 0.1 to 50 wt % and more preferably from 1 to 30 wt %.

The solvent is preferably volatilized at a heating temperature of 30 to 300° C. and more preferably 50 to 200° C.

After protective film-forming treatment, the protective film preferably has a thickness of 1 to 50 nm and more preferably 5 to 25 nm.

The microstructure of the present invention obtained by subjecting the aluminum substrate at least to, in order, the treatments (A) to (D) preferably has a degree of ordering of micropores as defined by formula (1):

$$\text{Degree of Ordering (\%)} = B/A \times 100 \quad (1)$$

(wherein A represents a total number of micropores in a measurement region; and B represents a number of specific micropores in the measurement region for which, when a circle is drawn so as to be centered on a center of gravity of a specific micropore and so as to be of a smallest radius that is internally tangent to an edge of another micropore, the circle includes centers of gravity of six micropores other than the specific micropore) of at least 20% as well as a pore opening area ratio as defined by formula (2):

$$\text{Pore opening area ratio (\%)} = C/D \times 100 \quad (2)$$

(wherein C represents a sum of opening areas of the micropores in the measurement region; and D is an area of the measurement region) of at least 40%. The micropores as used herein extend through the anodized film.

Figure 4A:
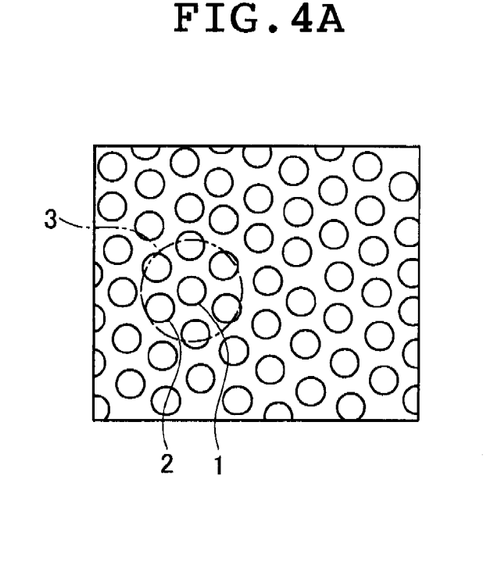
FIGS. 4A and 4B are views illustrating how to compute the degree of ordering of micropores.
Figure 4B:
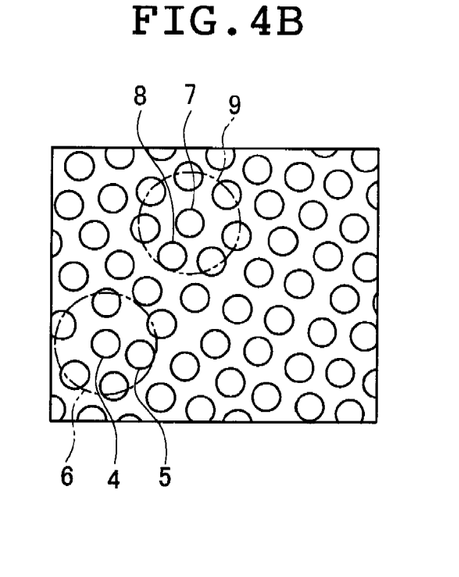
Figure 5:
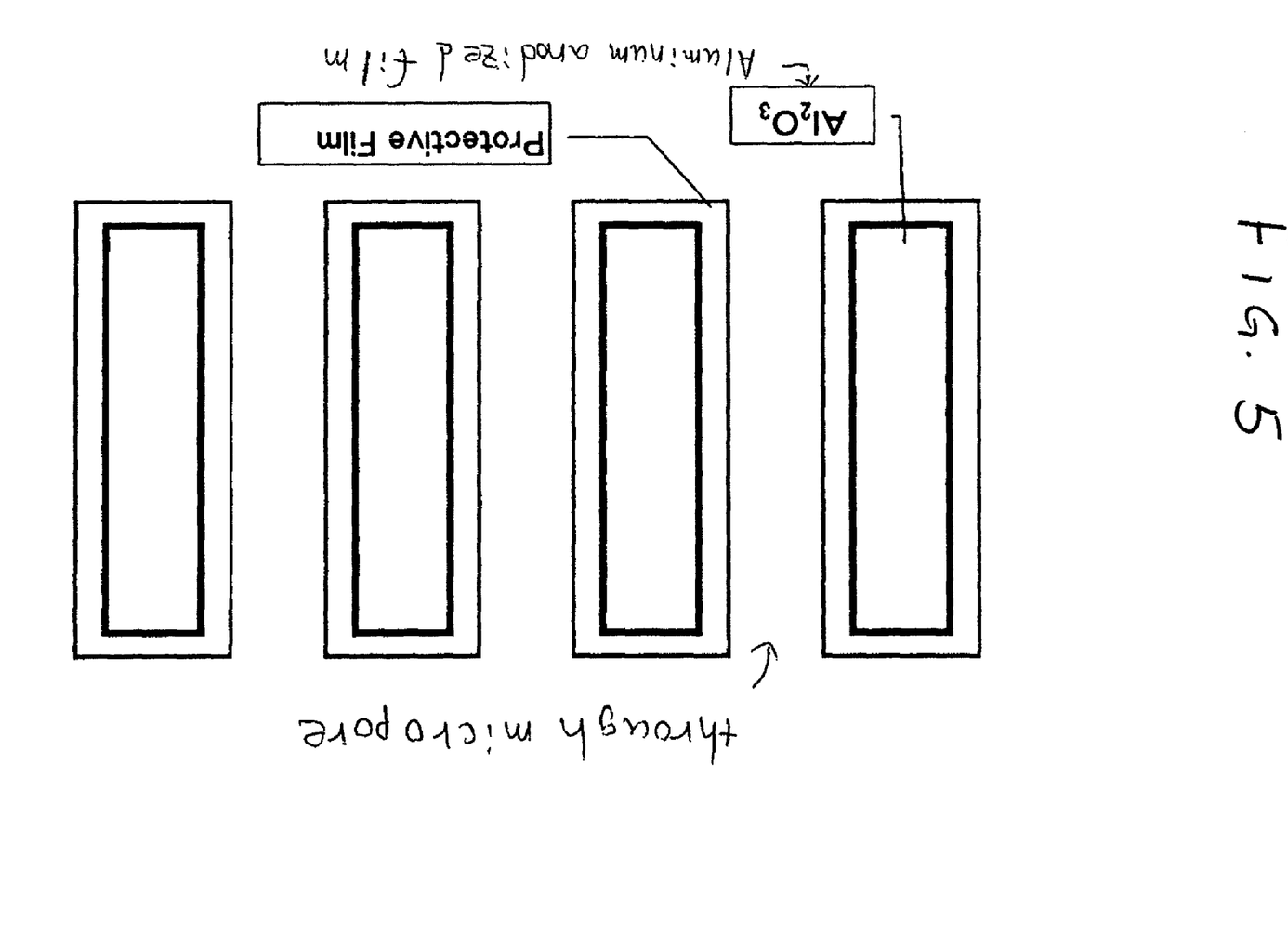
FIG. 5 is a cross sectional view of the microstructure.

FIGS. 4A and 4B are views illustrating a method for computing the degree of ordering of micropores. Formula (1) is explained more fully below in conjunction with FIGS. 4A and 4B.

With regard to a micropore 1 shown in FIG. 4A, when a circle 3 is drawn so as to be centered on the center of gravity of the micropore 1 and so as to be of the smallest radius that is internally tangent to the edge of another micropore (inscribed in a micropore 2), the interior of the circle 3 includes the centers of gravity of six micropores other than the micropore 1. Therefore, the micropore 1 is counted for B.

With regard to a micropore 4 shown in FIG. 4B, when a circle 6 is drawn so as to be centered on the center of gravity of the micropore 4 and so as to be of the smallest radius that is internally tangent to the edge of another micropore (inscribed in a micropore 5), the interior of the circle 6 includes the centers of gravity of five micropores other than the micropore 4. Therefore, the micropore 4 is not counted for B. With regard to a micropore 7 shown in FIG. 4B, when a circle 9 is drawn so as to be centered on the center of gravity of the micropore 7 and so as to be of the smallest radius that is internally tangent to the edge of another micropore (inscribed in a micropore 8), the interior of the circle 9 includes the centers of gravity of seven micropores other than the micropore 7. Therefore, the micropore 7 is not counted for B.

The microstructure of the present invention more preferably have a degree of ordering of micropores as defined by formula (1) of at least 40% and a pore opening area ratio as defined by formula (2) of at least 50%.

The microstructure of the present invention may also support an organic compound, an inorganic compound or fine metal particles in the micropores of the anodized film according to the intended application.

EXAMPLES

Examples are given below by way of illustration and should not be construed as limiting the invention.

Examples 1 to 5 and Comparative Example 1

1. Electrolytic Polishing

A high purity aluminum substrate (manufactured by Sumitomo Light Metal Industries, Ltd.; purity, 99.99 wt %; thickness, 0.4 mm) was cut into samples (area: 10 cm×10 cm) suitable for anodizing treatment. The samples were subjected to electrolytic polishing in an electrolytic polishing solution of the composition indicated below under the conditions of a voltage of 25V, a solution temperature of 65° C. and a solution flow rate of 3.0 m/min. A carbon electrode was used for the cathode. A GP0110-30R unit (Takasago, Ltd.) was used for the power supply. The flow rate of the electrolytic solution was measured with a vortex flow monitor FLM22-10PCW (manufactured by As One Corporation).

| <Electrolytic Polishing Solution Composition> | |
|---|---|
| 85 wt % Phosphoric acid (Wako Pure Chemical Industries, Ltd.) | 660 mL |
| Pure water | 160 mL |
| Sulfuric acid | 150 mL |
| Ethylene glycol | 30 mL |

2. (A) Micropore Formation Through Anodization

The samples polished as above were anodized under the conditions shown in Table 1. The anodized samples were immersed in a mixed aqueous solution of 0.2M chromic anhydride and 0.6M phosphoric acid at 50° C. for 12 hours to perform film removal. Then, the samples were anodized again under the conditions shown in Table 1 to form the micropore-bearing anodized film on the aluminum substrate surfaces.

In both of anodizing treatment and re-anodizing treatment, Use was made of a stainless steel electrode as the cathode, a GP0110-30R unit (Takasago, Ltd.) as the power supply, Neo-Cool BD36 (Yamato Scientific Co., Ltd.) as the cooling system, and Pairstirrer PS-100 (Tokyo Rikakikai Co., Ltd.) as the stirring and warming unit. The flow rate of the electrolytic solution was measured using the vortex flow monitor FLM22-10PCW (manufactured by As One Corporation).

3. (B) Aluminum Removal Treatment

The samples obtained above were treated under the conditions shown in Table 1 to remove the aluminum substrate portions.

4. (C) Through Micropore-Forming Treatment

The samples obtained above were treated under the conditions shown in Table 1 to form through micropores.

5. (D) Protective Film-Forming Treatment

The samples obtained above were treated under the conditions shown in Table 1 to obtain the microstructures in Examples 1 to 5. Treatment (D) was not performed in Comparative Example 1.

The microstructures obtained in Examples 1 to 5 and Comparative Example 1 were measured for their degree of ordering and pore opening area ratio. More specifically, their surfaces were photographed with a field emission scanning electron microscope (FE-SEM) at a magnification of 20,000× and the degree of ordering as defined by formula (1):

$$\text{Degree of Ordering (\%)} = B/A \times 100 \quad (1)$$

(wherein A represents a total number of micropores in a measurement region; and B represents a number of specific micropores in the measurement region for which, when a circle is drawn so as to be centered on a center of gravity of a specific micropore and so as to be of a smallest radius that is internally tangent to an edge of another micropore, the circle includes centers of gravity of six micropores other than the specific micropore), and the pore opening area ratio as defined by formula (2):

$$\text{Pore opening area ratio (\%)} = C/D \times 100 \quad (2)$$

(wherein C represents a sum of opening areas of the micropores in the measurement region; and D is an area of the measurement region) were measured with a field of view of 100 nm×100 nm. The degree of ordering and the pore opening area ratio were respectively measured at 10 points and the average values of the measurements obtained were calculated. The results are shown in Table 1.

The microstructures obtained in Examples 1 to 5 and Comparative Example 1 were evaluated for the filtration rate and properties with time. More specifically, the filtration rate of pure water at 20° C. was determined under the conditions of a drive pressure of 1.0 kgf·cm$^{-2}$ and filtration times of (a) 0 to 100 minutes and (b) 400 to 500 minutes. A higher filtration rate in the filtration times (a) and (b) indicates more excellent filterability and a smaller difference in the filtration rate between (a) and (b) indicates that the filterability is more excellent over time. The results are shown in Table 1.

TABLE 1

| | | | | Example 1 | Example 2 | Example 3 | Example 4 | Example 5 | Comparative Example 1 |
|---|---|---|---|---|---|---|---|---|---|
| Treatment for manufacture | (A) Micropore formation | Anodizing treatment | Solution composition | 0.5M oxalic acid | 0.5M oxalic acid | 0.3 M sulfuric acid | 0.5M oxalic acid | 0.5M oxalic acid | 0.5M oxalic acid |
| | | | Voltage | 40 V | 40 V | 25 V | 40 V | 40 V | 40 V |
| | | | Temperature | 15° C. | 15° C. | 15° C. | 15° C. | 15° C. | 15° C. |
| | | | Solution flow rate | 6 m/min | 6 m/min | 8 m/min | 6 m/min | 6 m/min | 6 m/min |
| | | | Time | 5 h | 5 h | 7 h | 1 h | 5 h | 5 h |
| | | Re-anodizing treatment | Solution composition | 0.5M oxalic acid | 0.5M oxalic acid | 0.3 M sulfuric acid | 0.5M oxalic acid | 0.5M oxalic acid | 0.5M oxalic acid |
| | | | Voltage | 40 V | 40 V | 25 V | 40 V | 40 V | 40 V |
| | | | Temperature | 15° C. | 15° C. | 15° C. | 15° C. | 15° C. | 15° C. |
| | | | Solution flow rate | 6 m/min | 6 m/min | 8 m/min | 6 m/min | 6 m/min | 6 m/min |
| | | | Time | 5 h | 5 h | 5 h | 5 h | 5 h | 5 h |
| | (B) Aluminum removal treatment | | Solution composition | 0.1M mercury chloride | 0.05 M aqua regia | 0.1M mercury chloride | 0.1M mercury chloride | 0.1M mercury chloride | 0.1M mercury chloride |
| | | | Temperature | 20° C. | 20° C. | 20° C. | 20° C. | 20° C. | 20° C. |
| | | | Time | 30 min | 5 min | 30 min | 30 min | 30 min | 30 min |

TABLE 1-continued

|  |  |  | Example 1 | Example 2 | Example 3 | Example 4 | Example 5 | Comparative Example 1 |
|---|---|---|---|---|---|---|---|---|
|  | (C) Through micropore-forming treatment | Solution composition | 0.5M phosphoric acid | 0.5M phosphoric acid | 0.5M phosphoric acid | 0.5M phosphoric acid | 0.5M phosphoric acid | 0.5M phosphoric acid |
|  |  | Temperature | 30° C. | 30° C. | 30° C. | 30° C. | 30° C. | 30° C. |
|  |  | Time | 20 min | 40 min | 10 min | 20 min | 5 min | 20 min |
|  | (D) Protective film-forming treatment | Solution composition | Mixture of 0.1% sodium fluoro-zirconate and 1% sodium hydrogen-phosphate | 1% sodium silicate No. 3 | Solution of 5% poly (vinylidene chloride) in MEK | Mixture of 0.1% sodium fluoro-zirconate and 1% sodium hydrogen-phosphate | Mixture of 0.1% sodium fluoro-zirconate and 1% sodium hydrogen-phosphate | — |
|  |  | Temperature | 75° C. | 20° C. | 75° C. | 75° C. | 75° C. | — |
|  |  | Time | 10 s | 15 s | 10 s | 10 s | 10 s | — |
| Shape | Degree of ordering of micropores |  | 90% | 90% | 90% | 30% | 90% | 90% |
|  | Micropore opening area ratio |  | 70% | 80% | 60% | 70% | 20% | 70% |
| Property | Filtration rate | (a) 0 to 100 min | 100 ml/cm² | 100 ml/cm² | 100 ml/cm² | 50 ml/cm² | 30 ml/cm² | 100 ml/cm² |
|  |  | (b) 400 to 500 min | 100 ml/cm² | 95 ml/cm² | 95 ml/cm² | 50 ml/cm² | 30 ml/cm² | 50 ml/cm² |

Example 6

A specific example of use of the microstructure in filter form according to the present invention is described below.

A slurry of an amorphous silicate material pulverized to an average particle size of 20 nm by a breakdown process and calcium oxide were mixed with a molar ratio of CaO to $SiO_2$ of 0.4. To the mixture was added with stirring a 10-fold weight of water based on the total weight of the material to prepare a slurry. Then, this slurry was placed in an autoclave and subjected to a hydrothermal reaction with stirring at 180° C. for 4 hours to obtain a calcium silicate slurry. The resulting slurry was cooled to 70° C. Acetic acid having a concentration as high as 99.7% which was required for removing calcium oxide in the calcium silicate was added to the slurry and the mixture was stirred for 10 minutes to obtain a solution. The microstructure prepared in Example 1 was immersed in the solution at an immersion temperature of 30° C. for 60 seconds, then dried at 120° C. and heated in an electric furnace at 600° C. for 1 hour to yield a highly protein-adsorbable silicate microfilter.

What is claimed is:

1. A microstructure comprising an aluminum anodized film bearing through micropores, wherein a surface of the microstructure is covered with a protective film for preventing hydration of the aluminum anodized film, wherein the protective film is formed over the aluminum anodized film and on the insides of the through micropores, wherein the through micropores are not blocked by the formation of the protective film, and wherein the protective film is an inorganic protective film containing at least one element selected from the group consisting of zirconium and silicon or an organic protective film containing a water-insoluble polymer.

2. The microstructure according to claim 1, wherein a degree of ordering of micropores as defined by formula (1):

$$\text{Degree of Ordering (\%)} = B/A \times 100 \quad (1)$$

(wherein A represents a total number of micropores in a measurement region; and B represents a number of specific micropores in the measurement region for which, when a circle is drawn so as to be centered on a center of gravity of a specific micropore and so as to be of a smallest radius that is internally tangent to an edge of another micropore, the circle includes centers of gravity of six micropores other than the specific micropore) is at least 20%, and a pore opening area ratio as defined by formula (2):

$$\text{Pore opening area ratio (\%)} = C/D \times 100 \quad (2)$$

(wherein C represents a sum of opening areas of the micropores in the measurement region; and D is an area of the measurement region) is at least 40%.

3. A microstructure formed by subjecting an aluminum substrate at least to, in order, (A) an anodizing treatment to form an anodized film bearing micropores;

(B) an aluminum removal treatment to remove aluminum from the aluminum substrate on which the anodized film obtained by the anodizing treatment (A) is formed;

(C) a through micropore-forming treatment to make the micropores extend through the anodized film obtained by the anodizing treatment (A); and (D) a protective film-forming treatment to form a protective film for preventing hydration of the anodized film on a surface of the anodized film, wherein the protective film is formed over the anodized film and on the insides of the micropores, wherein the through micropores are not blocked by the formation of the protective film, and wherein the protective film is an inorganic protective film containing at least one element selected from the group consisting of zirconium and silicon or an organic protective film containing a water-insoluble polymer.

4. The microstructure according to claim 3, wherein a degree of ordering of micropores as defined by formula (1):

$$\text{Degree of Ordering (\%)} = B/A \times 100 \qquad (1)$$

(wherein A represents a total number of micropores in a measurement region; and B represents a number of specific micropores in the measurement region for which, when a circle is drawn so as to be centered on a center of gravity of a specific micropore and so as to be of a smallest radius that is internally tangent to an edge of another micropore, the circle includes centers of gravity of six micropores other than the specific micropore) is at least 20%, and a pore opening area ratio as defined by formula (2):

$$\text{Pore opening area ratio (\%)} = C/D \times 100 \qquad (2)$$

(wherein C represents a sum of opening areas of the micropores in the measurement region; and D is an area of the measurement region) is at least 40%.

* * * * *